US007333966B2

(12) United States Patent
Dozier

(10) Patent No.: US 7,333,966 B2
(45) Date of Patent: Feb. 19, 2008

(54) SYSTEMS, METHODS, AND SOFTWARE FOR HYPERLINKING NAMES

(75) Inventor: Christopher C. Dozier, Eagan, MN (US)

(73) Assignee: Thomson Global Resources, Zug (CH)

( * ) Notice: Subject to any disclaimer, the term of this patent is extended or adjusted under 35 U.S.C. 154(b) by 746 days.

(21) Appl. No.: 10/171,170

(22) Filed: Jun. 13, 2002

(65) Prior Publication Data

US 2003/0135826 A1 Jul. 17, 2003

Related U.S. Application Data

(60) Provisional application No. 60/342,956, filed on Dec. 21, 2001.

(51) Int. Cl.
*G06F 7/00* (2006.01)
*G06F 17/30* (2006.01)
*G06F 15/18* (2006.01)
*G06E 1/00* (2006.01)
*G06E 3/00* (2006.01)

(52) U.S. Cl. .................... 706/21; 707/2; 707/100; 235/435; 706/20; 706/16

(58) Field of Classification Search ............... 709/217; 707/101, 3, 2, 100; 715/515; 706/21, 16, 706/20; 235/435
See application file for complete search history.

(56) References Cited

U.S. PATENT DOCUMENTS

| 3,872,448 A | 3/1975 | Mitchell, Jr. ............ 340/172.5 |
| 4,384,288 A | 5/1983 | Walton ..................... 340/825.34 |

(Continued)

FOREIGN PATENT DOCUMENTS

| EP | 0848337 | 12/1996 |
| EP | 0817099 | 1/1998 |
| WO | WO-96/18959 | 6/1996 |
| WO | WO-0043918 A2 | 7/2000 |
| WO | WO-01/22285 | 3/2001 |
| WO | WO-03060767 A2 | 7/2003 |
| WO | WO-2005066848 A1 | 7/2005 |

OTHER PUBLICATIONS

Dozier, Automatic Extraction and Linking of Person Names in Legal Text, Proceedings of Riao 2000, Apr. 2000, 1305-1321.*

(Continued)

*Primary Examiner*—Anthony Knight
*Assistant Examiner*—Sunray Chang
(74) *Attorney, Agent, or Firm*—Scwegman, Lundberg & Woessner P.A.

(57) ABSTRACT

Hyperlinking or associating documents to other documents based on the names of people in the documents has become more desirable. Although there is an automated system for installing such hyperlinks into judicial opinions, the system is not generally applicable to other types of names and documents, nor well suited to determine hyperlinks for names that might refer to two or more similarly named persons. Accordingly, the inventor devised systems, methods, and software that facilitate hyperlinking names in documents, regardless of type. One exemplary system includes a descriptor module and a linking module. The descriptor module develops descriptive patterns for selecting co-occurent document information that is useful in recognizing associations between names and professional classes. The linking module tags names in an input document, extracts co-occurent information using the descriptive patterns, and uses a Bayesian inference network that processes a (non-inverse-document-frequency) name-rarity score for each name along with the name and selected co-occurent document information to determine appropriate hyperlinks to other documents, such as entries in professional directories.

8 Claims, 6 Drawing Sheets

U.S. PATENT DOCUMENTS

| | | | |
|---|---|---|---|
| 4,575,621 A | 3/1986 | Dreifus | 235/380 |
| 4,817,050 A | 3/1989 | Komatsu et al. | 364/900 |
| 4,864,501 A | 9/1989 | Kucera et al. | 364/419 |
| 4,878,175 A | 10/1989 | Norden-Paul et al. | 364/413.01 |
| 4,887,212 A | 12/1989 | Zamora et al. | 364/419 |
| 4,893,270 A | 1/1990 | Beck et al. | 364/900 |
| 4,958,283 A | 9/1990 | Tawara et al. | 364/413.13 |
| 4,994,966 A | 2/1991 | Hutchins | 364/419 |
| 5,065,315 A | 11/1991 | Garcia | 364/413.01 |
| 5,146,439 A | 9/1992 | Jachmann et al. | 369/25 |
| 5,157,783 A | 10/1992 | Anderson et al. | 395/600 |
| 5,204,947 A | 4/1993 | Bernstein et al. | 395/157 |
| 5,218,697 A | 6/1993 | Chung | 395/650 |
| 5,233,513 A | 8/1993 | Doyle | 354/401 |
| 5,253,362 A | 10/1993 | Nolan et al. | 395/600 |
| 5,265,065 A | 11/1993 | Turtle | 395/600 |
| 5,283,884 A | 2/1994 | Menon et al. | 395/425 |
| 5,291,399 A | 3/1994 | Chaco | 364/413.02 |
| 5,297,249 A | 3/1994 | Bernstein et al. | 395/156 |
| 5,317,729 A | 5/1994 | Mukherjee et al. | 707/3 |
| 5,319,711 A | 6/1994 | Servi | 380/23 |
| 5,361,202 A | 11/1994 | Doue | 364/413.01 |
| 5,361,346 A | 11/1994 | Panesar et al. | 395/575 |
| 5,377,323 A | 12/1994 | Vasudevan | 395/200 |
| 5,404,435 A | 4/1995 | Rosenbaum | 395/147 |
| 5,408,655 A | 4/1995 | Oren et al. | 395/600 |
| 5,414,838 A | 5/1995 | Kolton et al. | 707/104.1 |
| 5,418,942 A | 5/1995 | Krawchuk et al. | 395/600 |
| 5,418,948 A | 5/1995 | Turtle | 395/600 |
| 5,434,932 A | 7/1995 | Scott | 382/309 |
| 5,434,974 A | 7/1995 | Loucks et al. | 395/200 |
| 5,438,655 A | 8/1995 | Richichi et al. | 395/142 |
| 5,459,860 A | 10/1995 | Burnett et al. | 395/600 |
| 5,488,725 A | 1/1996 | Turtle et al. | 395/600 |
| 5,490,250 A | 2/1996 | Reschke et al. | 375/185.01 |
| 5,497,317 A | 3/1996 | Hawkins et al. | 364/408 |
| 5,506,984 A | 4/1996 | Miller | 395/600 |
| 5,515,534 A | 5/1996 | Chuah et al. | 395/600 |
| 5,530,852 A | 6/1996 | Meske, Jr. et al. | |
| 5,535,372 A | 7/1996 | Benhase et al. | 395/500 |
| 5,541,583 A | 7/1996 | Mandelmaum | 340/825.54 |
| 5,544,352 A | 8/1996 | Egger | 707/5 |
| 5,557,539 A | 9/1996 | Fitch | 364/514 B |
| 5,558,638 A | 9/1996 | Evers et al. | 604/66 |
| 5,560,005 A | 9/1996 | Hoover et al. | 395/600 |
| 5,581,460 A | 12/1996 | Kotake et al. | 395/203 |
| 5,603,025 A | 2/1997 | Tabb et al. | 395/602 |
| 5,608,900 A | 3/1997 | Dockter et al. | 395/613 |
| 5,617,565 A | 4/1997 | Augenbraun et al. | 395/604 |
| 5,629,981 A | 5/1997 | Nerlikar | 380/25 |
| 5,644,720 A | 7/1997 | Boll et al. | 395/200.12 |
| 5,646,416 A | 7/1997 | Van de Velde | 250/584 |
| 5,659,676 A | 8/1997 | Redpath | 395/777 |
| 5,664,109 A | 9/1997 | Johnson et al. | |
| 5,708,825 A | 1/1998 | Sotomayor | 395/762 |
| 5,724,595 A | 3/1998 | Gentner et al. | 395/762 |
| 5,724,608 A | 3/1998 | Tohara | 395/827 |
| 5,740,252 A | 4/1998 | Minor et al. | 380/49 |
| 5,740,549 A | 4/1998 | Reilly et al. | 705/14 |
| 5,742,181 A | 4/1998 | Rush | 326/41 |
| 5,745,360 A | 4/1998 | Leone et al. | 364/140 |
| 5,745,908 A | 4/1998 | Anderson et al. | 707/513 |
| 5,751,961 A | 5/1998 | Smyk | 395/200.47 |
| 5,754,857 A | 5/1998 | Gadol | 395/680 |
| 5,761,436 A | 6/1998 | Nielsen | 395/200.75 |
| 5,764,906 A | 6/1998 | Edelstein et al. | 395/200.49 |
| 5,764,916 A | 6/1998 | Busey et al. | 395/200.57 |
| 5,781,900 A | 7/1998 | Shoji et al. | 707/6 |
| 5,794,050 A | 8/1998 | Dahlgren et al. | 395/708 |
| 5,794,236 A | 8/1998 | Mehrle | 707/5 |
| 5,806,079 A | 9/1998 | Rivette et al. | 707/512 |
| 5,815,830 A | 9/1998 | Anthony | 707/6 |
| 5,819,092 A | 10/1998 | Ferguson et al. | 395/701 |
| 5,819,273 A | 10/1998 | Vora et al. | 707/10 |
| 5,822,539 A | 10/1998 | van Hoff | 395/200.66 |
| 5,822,720 A | 10/1998 | Bookman et al. | 704/3 |
| 5,842,224 A | 11/1998 | Fenner | 711/202 |
| 5,860,073 A | 1/1999 | Ferrel et al. | 715/522 |
| 5,860,136 A | 1/1999 | Fenner | 711/201 |
| 5,862,325 A | 1/1999 | Reed et al. | 395/200.31 |
| 5,867,562 A | 2/1999 | Scherer | 379/88 |
| 5,867,821 A | 2/1999 | Ballantyne et al. | 705/2 |
| 5,873,077 A | 2/1999 | Kanoh et al. | 707/3 |
| 5,875,446 A | 2/1999 | Brown et al. | 707/3 |
| 5,878,421 A | 3/1999 | Ferrel et al. | 707/100 |
| 5,884,302 A | 3/1999 | Ho | 707/3 |
| 5,895,461 A | 4/1999 | De La Huerga et al. | 707/1 |
| 5,903,889 A | 5/1999 | De La Huerga | 707/3 |
| 5,905,866 A | 5/1999 | Nakabayashi et al. | 395/200.53 |
| 5,905,991 A | 5/1999 | Reynolds | 707/501 |
| 5,940,843 A | 8/1999 | Zucknovich et al. | 707/516 |
| 5,942,986 A | 8/1999 | Shabot et al. | 340/825.44 |
| 5,946,682 A | 8/1999 | Wolfe | 707/5 |
| 5,963,205 A | 10/1999 | Sotomayor | 345/333 |
| 5,963,940 A | 10/1999 | Liddy et al. | |
| 5,963,950 A | 10/1999 | Nielsen et al. | 707/102 |
| 5,970,505 A | 10/1999 | Ebrahim | 707/501 |
| 5,974,413 A | 10/1999 | Beauregard et al. | 707/6 |
| 5,987,454 A | 11/1999 | Hobbs | 707/4 |
| 5,987,475 A | 11/1999 | Murai | 707/200 |
| 6,014,662 A | 1/2000 | Moran et al. | 707/3 |
| 6,014,677 A | 1/2000 | Hayashi et al. | 707/501 |
| 6,025,844 A | 2/2000 | Parsons | 345/805 |
| 6,026,388 A | 2/2000 | Liddy et al. | 707/1 |
| 6,031,537 A | 2/2000 | Hugh | 345/357 |
| 6,038,573 A | 3/2000 | Parks | 707/513 |
| 6,091,412 A | 7/2000 | Simonoff et al. | 245/749 |
| 6,092,074 A | 7/2000 | Rodkin et al. | 707/102 |
| 6,094,649 A | 7/2000 | Bowen et al. | 707/3 |
| 6,122,647 A | 9/2000 | Horowitz et al. | 707/513 |
| 6,128,635 A | 10/2000 | Ikeno | 707/532 |
| 6,141,663 A | 10/2000 | Hunkins et al. | 707/201 |
| 6,151,624 A | 11/2000 | Teare et al. | 709/217 |
| 6,178,434 B1 | 1/2001 | Saitoh | 707/513 |
| 6,188,751 B1 | 2/2001 | Scherer | 379/88.22 |
| 6,216,141 B1 | 4/2001 | Straub et al. | 707/513 |
| 6,233,591 B1 | 5/2001 | Sherman et al. | 707/501 |
| 6,256,631 B1 | 7/2001 | Malcolm et al. | 707/10 |
| 6,263,121 B1 | 7/2001 | Melen et al. | 382/305 |
| 6,263,351 B1 | 7/2001 | Wolfe | 715/501.1 |
| 6,272,505 B1 | 8/2001 | De La Huerga | 707/501 |
| 6,308,171 B1 | 10/2001 | De La Huerga | 707/3 |
| 6,341,306 B1 * | 1/2002 | Rosenschein et al. | 709/217 |
| 6,345,268 B1 | 2/2002 | De La Huerga | 707/3 |
| 6,353,822 B1 * | 3/2002 | Lieberman | 707/3 |
| 6,356,922 B1 | 3/2002 | Schilit et al. | 707/512 |
| 6,434,567 B1 | 8/2002 | De La Huerga | 707/102 |
| 6,457,028 B1 | 9/2002 | Pitkow et al. | 715/513 |
| 6,507,837 B1 | 1/2003 | De La Huerga | 707/3 |
| 6,519,631 B1 * | 2/2003 | Rosenschein et al. | 709/217 |
| 6,654,758 B1 * | 11/2003 | Teague | 707/101 |
| 7,003,719 B1 | 2/2006 | Rosenoff et al. | |
| 2002/0032693 A1 | 3/2002 | Chiou et al. | |
| 2002/0087510 A1 | 7/2002 | Weinberg et al. | |
| 2002/0174105 A1 | 11/2002 | De La Huerga | 707/1 |
| 2003/0041305 A1 | 2/2003 | Schnelle et al. | 715/513 |
| 2003/0135826 A1 | 7/2003 | Dozier | |
| 2005/0234968 A1 | 10/2005 | Arumainayagam et al. | |
| 2007/0016848 A1 | 1/2007 | Rosenoff et al. | |

OTHER PUBLICATIONS

Borgman, C. L., et al., "Getty's Synoname and its Cousins: A Survey of Applications of Personal Name-Matching Algorithms",

*Journal of the American Society for Information Science, American society for Information*, 43 (7), (Aug. 1992),459-476.

Bush, Vannevar, "As we may think", *The Atlantic Monthly*, vol. CLXXVI, A Magazine of Literature, Science, Art and Politics,(1945),101-108.

Dozier, C., et al., "Automatic Extraction and Linking of Person Names in Legal Text", *Proceedings of RIAO 2000*, URL: http://citeseer.nj.nec.com/408698.html,(Apr. 2000),1305-1321.

Garret, L N., et al., "Intermedia: Issues, Strategies, and Tactics in the Design of a Hypermedia Document System", *Institute for Research in Information and Scholarship (IRIS)*, Brown University, Box 1946, Providence, RI 02912,163-174.

Newcombe, H. B., "Handbook of Record Linkage", *Oxford University Press, Oxford*, (1988),4-33.

Rhodes, Bradley J., et al., "A Continuously Running Automated Information Retrieval System", *The Proceedings of The First International Conference on The Practical Application Of Intelligent Agents and Multi Agent Technology*, (1996),487-495.

Rhodes, Bradley J., "Building a Contextually Aware Associative Memory", 219-224.

Smith, D. A., et al., "Disamiguating Geographic Names in a Historical Digital Library", *Research and Advanced Technology for Digital Libraries. 5th European Conference, ECDL 2001. Proceedings(Lecture Notes in Computer Science*, vol. 2163). *Research and Advanced Technology for Digital Liraries. 5th European Conference, ECDL 2001. Proceedings*, Berlin, Germany, Springer-Verlag,(2001),127-136.

Wilson, Eve, "Integrated Information Retrieval for Law in a Hypertext Envvionemt.", 663-677.

Winkler, William E., et al., "Machine Learning, Information Retrieval, and Record Linkage", *NISS Workshop on Data Quality*, (Nov. 30, 2000).

"Multimedia Hyperlinks Automatically Created for Reference Documents", *Research Disclosure*, 350 (9), Kenneth Mason Publications,(Jun. 1993).

Cooper, J. W., et al., "Lexical Navigation: Visually Prompted Query Expansion and Refinement", *Proceedings of the 2nd ACM Intl. Conf. on Digital libraries.*, (Jul. 23, 1997),237-246.

Cucerzan, S., et al., "Language Independent Named Entity Recognition Combining Morphological Contextual Evidence", *Joint Sigdat Conf. on empirical methods in natural language processing and very large corpa.*, (1999),90-99.

Greenleaf, G., et al., "The AustLII Papers—New Directions in Law via the Internet", *The Journal of Information, Law and Technology*, Issue 2. Retrieved from the Internet: <http://elj.warwick.au.uk/jilt/leginfo/97_2gree/>, (1997), 67 pgs.

Greenleaf, G., et al., "The DataLex Legal Index Workstation: Integrating Tools for Lawyers", *International Conference on Artificial Intelligence and law*, (1991), 215-224.

"User Generated Hypertext Links", *IBM Technical Disclosure Bulletin, IBM Corp.* NY, vol. 36, No. 10, XP000412443, (Oct. 1993), 453-454.

Anonymous, "Multimedia Hyperlinks Automatically Created for Reference Documents", *Research Disclsoure, GB, Industrial Opportunities Ltd.*, Havant No. 350, XP000372954, (Jun. 1993), 368.

Arents, H. C., "Using SGML on the Web", *Contribution to the SGML BeLux '95 Conference*, http://www.mtm.kuleuven.ac.be/hca/papers/SGML95Conference.html,(Oct. 1995), 8 pages.

Benson, D., et al., "Multimedia Data Management for Process Control", *International Conference on Multimedia Computing and Systems*, Boston, Mass,(1994), pp. 332-341.

Berners-Lee, T., et al., "rfc1738, Uniform Resource Locators (URL)", http://www.cis.ohio-state.edu/htbin/rfc/rfc1738.html, (Dec. 1994),pp. 1-24.

Borthwick, A., "A Maximum Entropy Approach to Named Entity Recognition", A dissertation submitted in partial fulfillment of the requirements for the degree of Doctor of Philosophy, Computer Science Department, New York University,(1999), pp. 1-105.

Borthwick, A., et al., "Exploiting Diverse Knowledge Sources via Maximum Entropy in Named Entity Recognition", Computer Science Department, New York University,(no date), 9 pages.

Brill, Eric, "Transformation-Based Error-Driven Learning and Natural Language Processing: A Case Study in Part of Speech Tagging", *Association for Computational Linguistics*, 21 (4), (1995), 1-37.

Chignell, Mark H., et al., "The Hefti Model of Text to Hypertext Conversion", *Hypermedia*, vol. 3, No. 3, XP000920503, (1991), 187-205.

Dingsoyr, Torgeir, "Bayesian Networks", http://www.idi.ntnu.no/~dingsoyr/dimpoma/node18.html, (Feb. 26, 1998), 3 pages.

Dozier, Christopher, "Assigning Belief Scores to Names in Queries", *Proceedings of Human Language Technologies Conference*, San Diego, California, (2001), 213-218.

Dozier, Christopher, et al., "Automatic Extraction and Linking of Person Names in Legal Text", *Proceedings of RIAO 2000: Content Based Multimedia Information Access*, Paris, France, (Apr. 2000), 1305-1321.

Golovchinsky, Gene, "What the Query Told the Link: The Integration of Hypertext and Information Retrieval", *ACM Conf. on Hypertext*, US, NY, ACM vol. Conf. 8, XP002116578, (1997), 67-74.

Hsu, L. H., et al., "A Multimedia Authoring-in-the-Large Environment to Support Complex Product Documentation", *Multimedia Tools and Applications 8.*, Kluwer Academic Publishers, Netherlands, (1999), pp. 11-64.

Ingham, David, et al., "Fixing the "Broken-Link" problem: the W3Objects approach", *Computer Networks and ISDN Systems*, 28, North Holland Publishing, Amsterdam, NL, (1996), pp. 1225-1268.

Liu, P., et al., "Towards Automating the Creation of Hypermedia Service Manuals by Compiling Specifications", *International Conference on Multimedia Computing and Systems*, Boston, Mass, (1994), pp. 203-212.

Neidermayer, Daryle, "An Introduction to Bayesian Networks and their Contemporary Applications", http://www.gpfn.sk.ca/~daryle/papers/bayesian_networks/bayes.html, (Dec. 1, 1998), 14 pages.

Page, C. R., "The Nuffield Interactive Book System", *Educational and Training Technology Int'l*, vol. 28, No. 4, XP000920523, (Nov. 1991), 334-340.

Powell, T. A., et al., "URL Formulas", *HTML Programmer's Reference, Osborne/McGraw-Hill*, USA, XP002140271, Osborne/McGraw-Hill, XP002140271, (1998), 364-367.

Zhang, Nevin L., et al., "Exploiting Causal Independence in Bayesian Network Inference", http://www.cs.ubc.ca/spider/poole/papers/ZhangPoole96/ZhangPoole96.html, (Dec. 6, 1996), 2 pages.

"Introduction to WebFountain: Very Large Scale UnCommon Sense for Text", Powerpoint presentation; Almaden Research Center, San Jose, CA, (Dec. 5, 2003), 31 pages.

"WebFountain Application Development Guide, 1st Edition", R. Tretau et al., Eds., Redbooks, (Oct. 2003), 250 pages.

Chase, Victor D., "Made to Order: IBM makes sense of unstructured data", *IBM Think Research*, http://www.research.ibm.com/thinkresearch/pages/2002/20020308_unstructured.shtml, (2002), 6 pages.

Dozier, Christopher, et al., "Combining Record Linkage and Information Extraction to Mine Text", *ACM SIGKDD 2003 Workshop on Data Cleaning, Record Linkage, and Object Consolidation*, (Aug. 2003), 2 pages.

Dozier, Christopher, et al., "Cross Document Co-Reference Resolution Applications for People in the Legal Domain", *Proceedings of the Workshop on Reference Resolution and Its Applications*, 42nd Meeting of the Association for Computational Linguistics, (Jul. 2004), 8 pages.

Fleischman, Michael B., et al., "Multi-Document Person Name Resolution", *Proceedings of the Workshop on Reference Resolution and Its Applications*, 42nd Meeting of the Association for Computational Linguistics, (Jul. 2004), 8 pages.

Kumar, Ravi, et al., "Extracting large-scale knowledge bases from the web", *Proceedings of the 25th VLDB Conference*, Edinburgh, Scotland, (1999), 12 pages.

* cited by examiner

SYSTEMS, METHODS, AND SOFTWARE FOR HYPERLINKING NAMES

CROSS-REFERENCE TO RELATED APPLICATION

This application claims priority to U.S. provisional application 60/342,956 filed on Dec. 21, 2001. The provisional application is incorporated herein by reference.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright© 2001, West Group.

TECHNICAL FIELD

The present invention concerns systems, methods, and software for hyperlinking names in documents.

BACKGROUND

In recent years, the fantastic growth of the Internet and other computer networks has fueled an equally fantastic growth in the data accessible via these networks. One of the seminal modes for interacting with this data is through the use of hyperlinks within electronic documents.

Hyperlinks are user-selectable elements, such as highlighted text or icons, that link one portion of an electronic document to another portion of the same document or to other documents in a database or computer network. With proper computer equipment and network access, a user can select or invoke a hyperlink and almost instantaneously view the other document, which can be located almost anywhere in the world. Moreover, the other document itself can include hyperlinks to yet other documents that include hyperlinks, allowing the user to "hop" around the world from document to document to document seeking relevant information at will.

More recently, there has been interest in hyperlinking documents to other documents based on the names of people in the documents. For example, to facilitate legal research, West Publishing Company of St. Paul, Minn. provides thousands of electronic judicial opinions that hyperlink the names of attorneys and judges to their online biographical entries in the West Legal Directory, a proprietary directory of approximately 1,000,000 U.S. attorneys and 20,000 judges. These hyperlinks allow users accessing judicial opinions to quickly obtain contact and other specific information about lawyers and judges named in the opinions.

The hyperlinks in these judicial opinions are generated automatically, using a system that treats first, middle, and last names; law firm name, city, and state; and court information as clues to link named attorneys and judges to their corresponding entries in the professional directory. See Christopher Dozier and Robert Haschart, "Automatic Extraction and Linking of Person Names in Legal Text" (Proceedings of RIAO 2000: Content Based Multimedia Information Access. Paris, France. pp. 1305-1321. April 2000), which is incorporated herein by reference.

Although the automated system is highly effective, the present inventor recognized that it suffers from at least two limitations. First, the system exploits structural (organizational) features in judicial opinions, such as case headers, that are not common to other documents and thus limits its general application to other types of names and documents. Second, the system treats all names as equally ambiguous, or equally common, when, in fact, some names are more or less ambiguous than others. For example, the name David Smith is more common than the name Seven Drake and thus more ambiguous, or more likely to identify more than one person.

Accordingly, the present inventor has identified a need for other methods of generating hyperlinks for names, or more generally associating data that include names.

SUMMARY

To address this and other needs, the inventor devised systems, methods, and software that facilitate hyperlinking or associating names in documents, such as news articles, to or with names in other data structures, such as records in professional directories. One exemplary system includes a descriptor module and a linking module. The descriptor module develops descriptive patterns for selecting co-occurent document information that is useful in recognizing associations between names and professional classes. The linking module tags names in an input document, extracts co-occurent information using the descriptive patterns, classifies each names as belonging to a particular profession, and attempts to find corresponding entries in professional directories.

To find the corresponding entries, the linking module determines a name-rarity (uniqueness or ambiguity) score for each name and inputs this score along with the name and selected co-occurent document information into a Bayesian inference network. The inference network measures the probabilities that the name refers to particular candidate records (or entries) in a given professional directory. The linking module ranks the candidate records based on the probability measurements and defines a hyperlink (or other logical association) based on the highest-ranking record that exceeds a given threshold.

The inventor also devised systems, methods, and software that facilitate searching for data that includes potentially ambiguous terms, such as names of persons or other entities. For example, one method entails receiving a query from a user, identifying one or more names in the query, assessing ambiguity or uniqueness of the names, and if the ambiguity is sufficiently great, obtaining further information and updating or supplementing the query to assist in resolving or reducing the ambiguity. The further information, which, for example, includes a professional title, location, or organization, can be obtained directly from the user or through automatic supplemental searching.

DETAILED DESCRIPTION OF EXEMPLARY EMBODIMENTS

The following detailed description, which references and incorporates FIGS. 1-6, describes and illustrates one or more exemplary embodiments of the invention. These embodiments, offered not to limit but only to exemplify and teach the invention, are shown and described in sufficient detail to enable those skilled in the art to make and use the invention. Thus, where appropriate to avoid obscuring the invention, the description may omit certain information known to those of skill in the art.

DEFINITIONS

The description includes many terms with meanings derived from their usage in the art or from their use within the context of the description. As a further aid, the following term definitions are presented.

The terms "a" and "an" refer to at least one.

The term "or" is used in its Boolean logical sense, unless used in conjunction with "either."

The term "document" refers to any logical collection or arrangement of machine-readable data having a filename.

The term "database" includes any logical collection or arrangement of machine-readable documents.

The term "hyperlink" includes any token in a document conforming structurally or functionally to any past, present, or future Uniform Resource Locator (URL) standard. It also includes any token including information identifying a specific computer system or networked device.

The term "name" includes one or more words by which an entity, such as person, animal, place, thing, group, organization or legal entity, is designated and distinguished from others.

The term "program modules" include routines, programs, objects, components, data structures, and instructions, or instruction sets, and so forth, that perform particular tasks or implement particular abstract data types. The term is not limited in terms of particular carrier medium.

Exemplary Computer System Embodying the Invention

Figure 1:
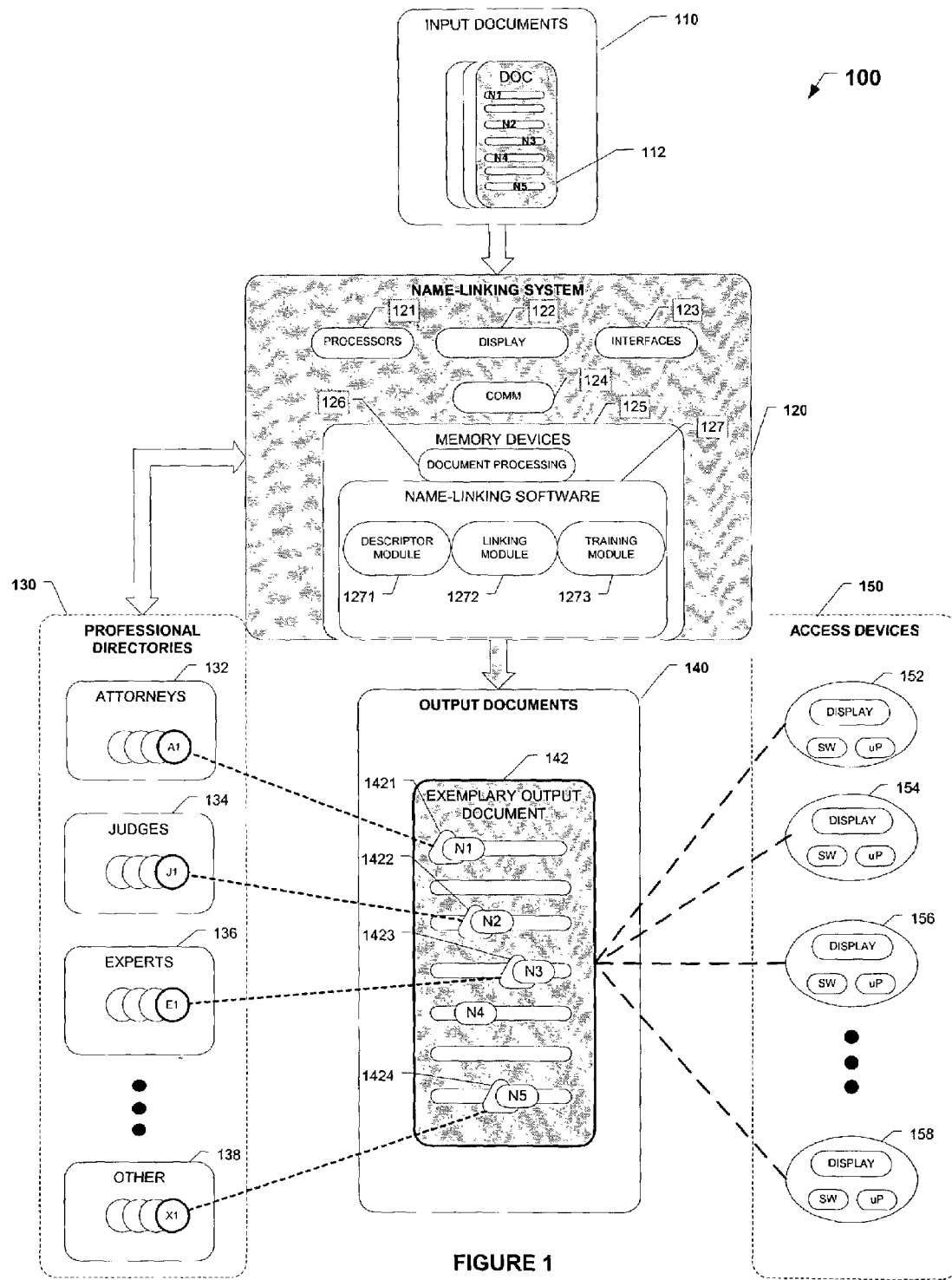
FIG. 1 is a block diagram of an exemplary system 100 incorporating teachings of the present invention.

FIG. 1 shows a diagram of an exemplary computer system 100 incorporating a system, method, and software for automatically marking one or more portions of a document and defining one or more corresponding hyperlinks for each marked portion. Though the exemplary system is presented as an interconnected ensemble of separate components, some other embodiments implement their functionality using a greater or lesser number of components. Moreover, some embodiments intercouple one or more the components through wired or wireless local- or wide-area networks. Some embodiments implement one or more portions of system 100 using one or more mainframe computers or servers.) Thus, the present invention is not limited to any particular functional partition.

Generally, system 100 includes an input document database 110, a name-link subsystem 120, professional directories 130, an output documents database 140, and access devices 150.

Input documents database 110 includes one or more electronic documents, of which a document 112 is shown as representative. Document 112 includes one or more names of persons, places, things, or legal entities (more generally proper nouns, such as N1, N2, N3, N4, and N5 distributed throughout the document. In the exemplary embodiment, document 112 is an electronic version of a written news article or other text document, for example, a judicial opinion or other type legal document. However, in other embodiments, document 112 includes one or more images or multimedia data containing one or more names.

Coupled to database 120 is a computerized name-linking system 120. System 120 includes one or more conventional processors 121, display device 122, interface devices 123, network-communications devices 124, memory devices 125, document-processing software 126 and marking-and-linking software 127. Software 126 and 127 includes various software and data components which can take a variety of forms, such as coded instructions or data on an electrical, magnetic, and/or optical carrier medium, and which can be installed on system 120 separately or in combination through a network-download or through other software transfer methods.

Examples of document-processing software include word-processing programs, HTML-editing programs, spreadsheet programs, electronic-mail programs, presentation-development programs, browsing programs, document-management programs, and file-backup programs. Thus, the invention is not limited to any particular genus or species of document-processing software.

In the exemplary embodiment, software 127 is an add-on tool to document-processing software 126. However, in other embodiments, it operates as a separate application program, such as a network-accessible program, or as part of the kernel or shell of an operating system. More particularly, software 127 includes a descriptor module 1271, a linking module 1272, and a training module 1273, all of which are described in further detail below.

Processor 120 is coupled to professional directories 130 and output documents database 140.

Professional directories 130 include one or more professional directories, such as an attorney directory 132, a judge directory 134, an expert database 136, and an other— professionals directory 138. Each directory (or more generally database) includes a set of records or other data structures containing information associated with one or more named or identified entities, such as persons, places, things, or legal entities. For example, attorney directory 132 includes a number of attorney records, such as exemplary attorney record A1; judge directory 134 includes a number of judge records, such as exemplary judge record J1; expert directory 136 includes a number of expert records, such as exemplary expert record E1; and other directory includes a number of records which contain information associated with other individuals, such as doctors, professors, accountants, teachers, celebrities, etc. Some embodiments may include databases of telephone and e-mail addresses, credit reports, tax reports, criminal records, medical information, school records, etc.

Output documents database 140 includes one or more processed documents, such as an exemplary document 142.

Document 142 includes marked names N1, N2, N3, N4, N5 and respective hyperlinks 1421, 1422, 1423, 1424, and 1425, which each reference a biographical record or other data structure within at least one of professional directories 130, or to one of the professional directories without designation of a particular directory record, or to a subset of records in a directory. Hyperlinks 1421-1425, generated by name-link processor 120 and embedded within or otherwise associated with the document, are selectable to link respective marked name portions N1, N2, N3, N4, N5 of document 140 to databases 130, 132, and 134 via a public or private local- or wide-area network or dedicated communications path (not shown.) The exemplary embodiment presents the marked names in a contrasting color or font, or in other user-detectable ways, to signify its association with an existing hyperlink. Documents within output database 140 are accessible over a local-or wide-area network through access devices 150.

The exemplary embodiments provides output database 140 as part of a web server, such as a Microsoft Internet Information Server 4.0 running on a network of several servers with processors and extended memory and disk configurations. Database 140 can take on any number of forms on a variety of computer platforms. Moreover, in some embodiments, database 140 includes redundant content to allow for more than one device, like access devices 150, to simultaneously access multiple copies of the same document.

Access devices 150 include exemplary access devices 152, 154, 156, and 158. Each access devices includes a display, a processor (uP), and software (SW). The term "access device," as used herein, encompasses browser-equipped personal computers, network appliances, personal digital assistants, telephones, cell phones, web phones, televisions, web television, etc. It also includes monitors and other types of equipment which can output data in a form with which users or other computers can interact. Thus, the present invention is not limited to any particular class or form of access device.

Exemplary Operation of System 100

In general, exemplary operation of system 100 entails operation of descriptor module 1271, linking module 1272, and training module 1273. Descriptor module 1271 generates one or more professional-name descriptor structures or patterns for use in identifying names that are likely to refer to individuals within one or more particular professional classes (or satisfy other predetermined criteria.) Linking module 1272 receives an input document, such as document 110, and hyperlinks one or more names in the input document to one or more professional directories, based on professional-name descriptor structures and/or other data extracted from document 110 and input into a Bayesian inference network. Training module 1273 defines the conditional probabilities at various nodes in the Bayesian inference network used by linking module 1272.

A. Descriptor Module Structure and Operation

Figure 2:
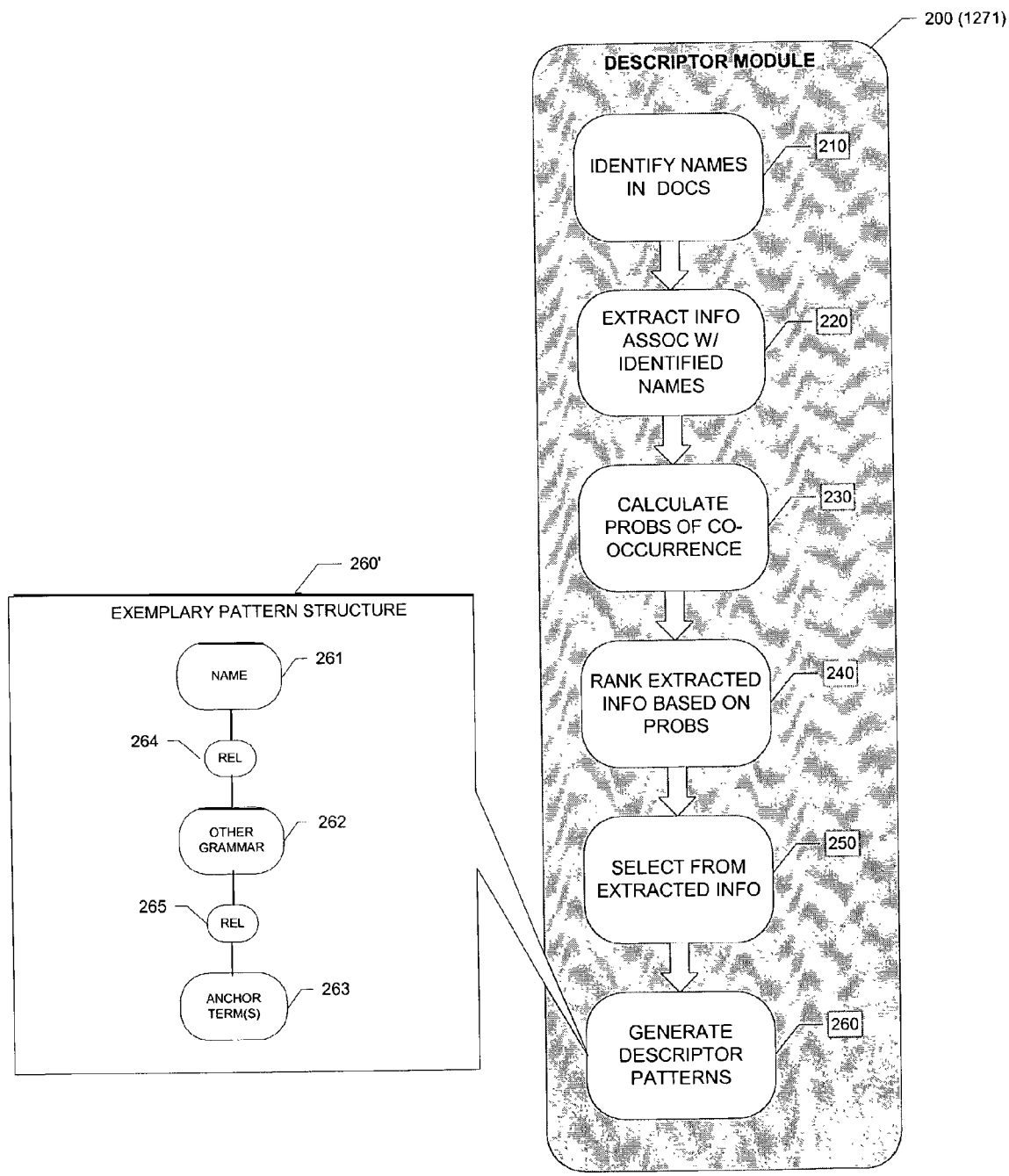
FIG. 2 is a flow chart of an exemplary method of operating system 100 to define expressions or descriptors for use in classifying and linking names.

More particularly, FIG. 2 shows a flowchart 200 illustrating an exemplary method of operating descriptor module 1271 to generate name descriptors for a given profession. One premise of the exemplary embodiment is that some personal names are much more likely to pertain to a single individual than other names and that when such names are also associated with a common profession (or other classification), one can automatically identify descriptive language common to people in the profession (or classification). This language then could be used to identify most members of the profession (or classification) who are named in the corpus.

Flow chart 200 includes process blocks 210-260. Though these blocks (and those of other flow charts in this document) are arranged serially in the exemplary embodiment, other embodiments may reorder the blocks, omit one or more blocks, and/or execute two or more blocks in parallel using multiple processors or a single processor organized as two or more virtual machines or subprocessors. Moreover, still other embodiments implement the blocks as one or more specific interconnected hardware or integrated-circuit modules with related control and data signals communicated between and through the modules. Thus, this and other exemplary process flows in this document are applicable to software, firmware, hardware, and other types of implementations.

Block 210 entails identifying names in a collection of documents (or corpora) that match names in a professional directory and names that do not match. Identifying matching and non-matching names—that is, in-directory and out-of-directory names, entails identifying all names in the collection using a name-tagging program and then executing a search against a professional directory, such as one of professional directories 130. Although the present invention is not limited to any genus or species of name tagger, suitable examples of name taggers include the NetOwl parsing software from IsoQuest, Inc. of Fairfax, Va. (The inventor contemplates a name tagger based on a maximum-entropy model for some embodiments.)

After executing the search, the exemplary embodiment identifies a subset of the in-directory names as rare or unique in-directory names. This entails computing name-uniqueness probability for each in-directory name, with the name-uniqueness probability based on a language model for the names in the directory. The exemplary language model is defined in terms of first-name probability and last-name probability, with each first-name and last-name probability based respectively on the ratio of the total number of occurrences of the first name and last name to the total number of names in a list of names drawn from the general population.

The list of names should be large enough to represent accurately the distribution of names in the general population. If the professional directory or other database is large enough, it can be used as the basis for the language model. If the professional directory is small, the language model should be based on some other list such as the list of licensed professionals listed in public records across the United States. The description that follows assumes that the professional directory (or database) in question is large enough to be representative of the names in the general population.

Once the language model is defined, the name-match probability score for each in-directory name is computed using $$P(\text{name}) = P(\text{first name}) \cdot P(\text{last name}) \tag{1}$$

where P (first name) denotes the probability of drawing the first name at random from all the first names in the directory and P(last name) similarly denotes the probability of drawing the last name at random from all the last names in the directory. A probability of name uniqueness or rarity is then computed as $$P(nameUniqueness) = \frac{1}{(H \cdot P(name)) + 1} \quad (2)$$

where H denotes the size of the human population likely to be referenced in the corpus. For example, for a corpus consisting of Wall Street Journal articles, H is taken to be 300 million, the approximate population of the United States. Each in-directory name that has a name-uniqueness probability exceeding a threshold value, such as 0.07, is then used as a basis, along with the out-of-directory names for further processing at block 220.

Block 220 extracts document information co-occurring or otherwise associated with one or more of the identified in-directory names and one of more of the out-of-directory names. In the exemplary embodiment, this entails extracting text or information within a certain textual window (or document region) around each of the rare in-directory names and around all the out-of-directory names.

More specifically, exemplary extraction entails extracting unigrams and bigrams occurring within a textual window extending eight words before and eight words after each occurrence of identified rare in-directory and out-of-directory names in the corpus. (Other embodiments use other sizes and forms of text windows, such as documents grammatical or organizational structures. For instance, some embodiments define the window based on number of characters, sentence, or subsection.) The unigrams and bigrams associated with in-directory names are defined as co-occurring in-directory unigrams and bigrams, whereas those associated with out-of-directory names are referred to as co-occurring out-of-directory unigrams and bigrams. Execution continues at block 230.

Block 230 determines a probability or likelihood that the extracted information will occur with an in-directory name rather than an out-of-directory name. In the exemplary embodiment, this entails computing the probability of each in-directory unigram and bigram occurring within an eight-word window before and after the out-of-directory names, and the probability of each out-of-directory unigram and bigram occurring within an eight-word window before and after the in-directory names. These co-occurrence probabilities are computed as $$P(\text{unigram/in-directory rare name}) = \frac{IU}{NI} \quad (3)$$

where IU=number of times unigram occurs in window with an in-directory rare name and NI=number of in-directory rare names.

$$P(\text{unigram/out-of-directory rare name}) = \frac{OU}{NO} \quad (4)$$

where OU denotes the number of times unigram occurs in window with an out-of-directory name and NO denotes the number of out-of-directory names.

$$P(\text{bigram/in-directory rare name}) = \frac{IB}{NI} \quad (5)$$

where IB denotes the number of times bigram occurs in window with in-directory rare name and NI the number of in-directory rare names.

$$P(\text{unigram/out-of-directory rare name}) = \frac{OB}{NO} \quad (6)$$

where OB denotes the number of times bigram occurs in window with an out-of-directory name and NO denotes the number of out-of-directory names.

To determine the likelihood of unigrams and bigrams co-occurring with an in-directory rare name rather than an out-of-directory name, the exemplary embodiment divides the in-directory rare name co-occurrence probability by the respective the out-of-directory co-occurrence probability. These likelihood formulations are expressed as $$L(\text{unigram}) = \frac{P(\text{unigram/in-directory rare name})}{P(\text{unigram/out-of-directory rare name})} \quad (7)$$

$$L(\text{bigram}) = \frac{P(\text{bigram/in-directory rare name})}{P(\text{bigram/out-of-directory rare name})} \quad (8)$$

where L(unigram) is the likelihood of co-occurrence of a given unigram with an in-directory rare name and L(bigram) is the likelihood of co-occurrence of a given bigram with an in-directory rare name.

Block 240 ranks the extracted information based on the co-occurrence likelihoods of preceding and trailing unigrams and bigrams. To this end, the exemplary embodiment ranks or sorts the co-occurring indirectory unigrams and bigrams in descending order of their in-directory rare name co-occurrence likelihoods. (Other embodiments may compute and use co-occurrence probabilities.) Examples of ranked lists of preceding and trailing unigrams and bigrams for legal professionals along with their likelihood scores are shown in the following two tables.

TABLE 1

Preceding and Trailing Unigram Examples

| Preceding Unigram | Likelihood Score | Trailing Unigram | Likelihood Score |
| --- | --- | --- | --- |
| Solicitor | 74.32 | Judges | 46.45 |
| Judge | 44.69 | Attorney | 22.40 |
| Lawyer | 18.94 | Lawyer | 18.34 |
| Counsel | 10.22 | Prosecutor | 12.38 |
| congressman | 10.13 | Attorneys | 9.29 |
| Attorney | 6.89 | Counsel | 8.37 |
| Prosecutor | 6.75 | Judge | 7.96 |

TABLE 2

Preceding and Trailing Bigram Examples

| Preceding Bigram | Likelihood Score | Trailing Bigram | Likelihood Score |
|---|---|---|---|
| District judge | 152.37 | lead counsel | 92.91 |
| Court judge | 106.85 | Tax lawyer | 55.75 |
| General counsel | 15.03 | senior attorney | 55.75 |
| city attorney | 14.86 | Former congressman | 55.75 |
| democratic leader | 14.45 | u.s. attorney | 37.16 |
| District attorney | 12.38 | Law professor | 18.58 |

Block 250 entails selecting one or more set of the extracted information based on the rankings In the exemplary embodiment, this is a manual selection process; however, other embodiments may apply an automatic selection criteria based, for example, on a specific minimum rank or a specific minimum rank in combination with a minimum threshold.

More specifically, the exemplary embodiment selects two sets of terms, referred to as anchor terms. The first set of anchor terms include terms that have a high likelihood of preceding an in-directory rare name, and the second set of anchor terms include terms that have a high likelihood of trailing such a name. In many instances, the anchor terms are the nouns in appositive phrases or clauses that precede or trail a given name. The exemplary embodiment also groups lowercase terms that are synonymous with each other. For example, terms such as,"lawyer," "counsel," and "prosecutor" are considered synonymous with "attorney," and are thus grouped together to form a single anchor term to reduce the number of regular expressions or descriptors generated at block 260.

Block 260 entails automatically generating profession descriptor patterns (or expressions) that correlate with membership in the profession. The exemplary descriptors represent grammatical patterns in corpus fragments that are bounded by in-directory rare names and the selected anchor terms.

The exemplary embodiment generates the patterns in the following way. For each sentence fragment, bounded by an anchor term and a rare name, the exemplary embodiment derives a generalized pattern (or structure) by splitting the fragment on space characters and commas into separate tokens and then normalizing each token based on its most commonly associated part of speech in an English lexicon. Tokens outside the lexicon are typed "other," and forms of the verb "to be" are typed "is" to distinguish them from other verbs. Punctuation marks other than commas are typed as "other." The exemplary embodiment uses a publicly available English lexicon of about 90,000 words, with each word associated with one or more parts of speech, listed in order of frequency within a corpus. An exemplary vocabulary for the descriptive patterns is shown in Table 3.

TABLE 3

Exemplary Vocabulary for Descriptive Patterns

| Pattern Symbol | Grammar Feature | Examples |
|---|---|---|
| $det- | determiner | a, an, the |
| $pos | Possessive | his, our |
| $adj | Adjective | legal |
| $noun | Noun | attorney |
| $prep | Preposition | for |

TABLE 3-continued

Exemplary Vocabulary for Descriptive Patterns

| Pattern Symbol | Grammar Feature | Examples |
|---|---|---|
| $pronoun | Pronoun | he |
| $properNoun | proper noun | Johnsons |
| $adv | Adverb | legally |
| $inf | Infinitive marker | to |
| $isVerb | forms of verb "to be" | is, was |
| $verb | Verb | said |
| $comma | Comma | , |
| $other | All other parts of speech or punctuation | |
| \s | space | |

Next, the exemplary embodiment creates a merged list of unique patterns and counts how often each is repeated in the corpus. The patterns are then sorted based on their occurrence counts, and singular patterns are discarded. The remaining patterns are then taken as indicative of membership in the given profession.

Inset box 260' shows that an exemplary pattern structure includes a name structure 261, grammar structures 262, an anchor-terms structure 263, and relative positional data 264 and 265. Name structure 261 is a placeholder for a name in a fragment. Grammar structures 262 include punctuation, parts-of-speech identifiers, and associated positional information indicative of any existing grammatical structural patterns between the name and anchor-terms structure 263. Anchor-terms structure 263 represents and includes one or more anchor terms.

Relative positional data 264 and 265 respectively indicate the relative position of name structure 261 and grammar structures 262, and grammar structure 262 and anchor terms 263. Although the exemplary embodiment implements the relative positional data implicitly in terms of the ordering of the data within the pattern structure, other embodiments explicitly denote the relative position as "before" or "after." Some embodiments omit the name structure and/or intervening grammar structures and define patterns in terms of word or character distance between anchor terms and an implicit name structure.

Examples of profession-descriptive patterns for identifying attorneys from a corpus of news articles are shown in the following table. Also shown are corresponding sentence fragments extracted from a document using these patterns.

TABLE 4

Examples of Attorney-Descriptive Patterns and Sentence Fragments

| Attorney Descriptor Patterns | Example Retrieved Fragments |
|---|---|
| $Anchor $comma \s+ $Name | attorney, <name> |
| $Anchor \s+ $Name | Attorney general <name> |
| $Anchor \s+ $prep \s+ $det \s+ $other | attorney for the Johnsons, |
| $comma \s+ $Name | <name> |
| $Name $comma \s+ $det $Anchor | <name>, a lawyer |
| $Name $comma \s+ $pos \s+ $Anchor | <name>, his attorney |
| $Name $comma \s+ $det \s+ $adj \s+ $Anchor | <name>, a defense attorney |

In essence, the exemplary embodiment uses rare or less ambiguous names as virtual tags to identify or filter out a set of exemplary sentence fragments that contain descriptions of named professionals and that can be used as the basis for defining grammatically descriptive patterns. The rarity filter serves to identify good examples much more efficiently than looking at sentence fragments around personal names in general. These patterns are then used to assist in automatic generation of hyperlinks in linking module 1272.

B. Linking Module Structure and Operation

Generally, linking module 1272 (in FIG. 1) receives an input document, such as document 110, and hyperlinks one or more names in the input document to one or more professional directories, based on the professional-name descriptor structures defined by descriptor module 1271.

Figure 3:
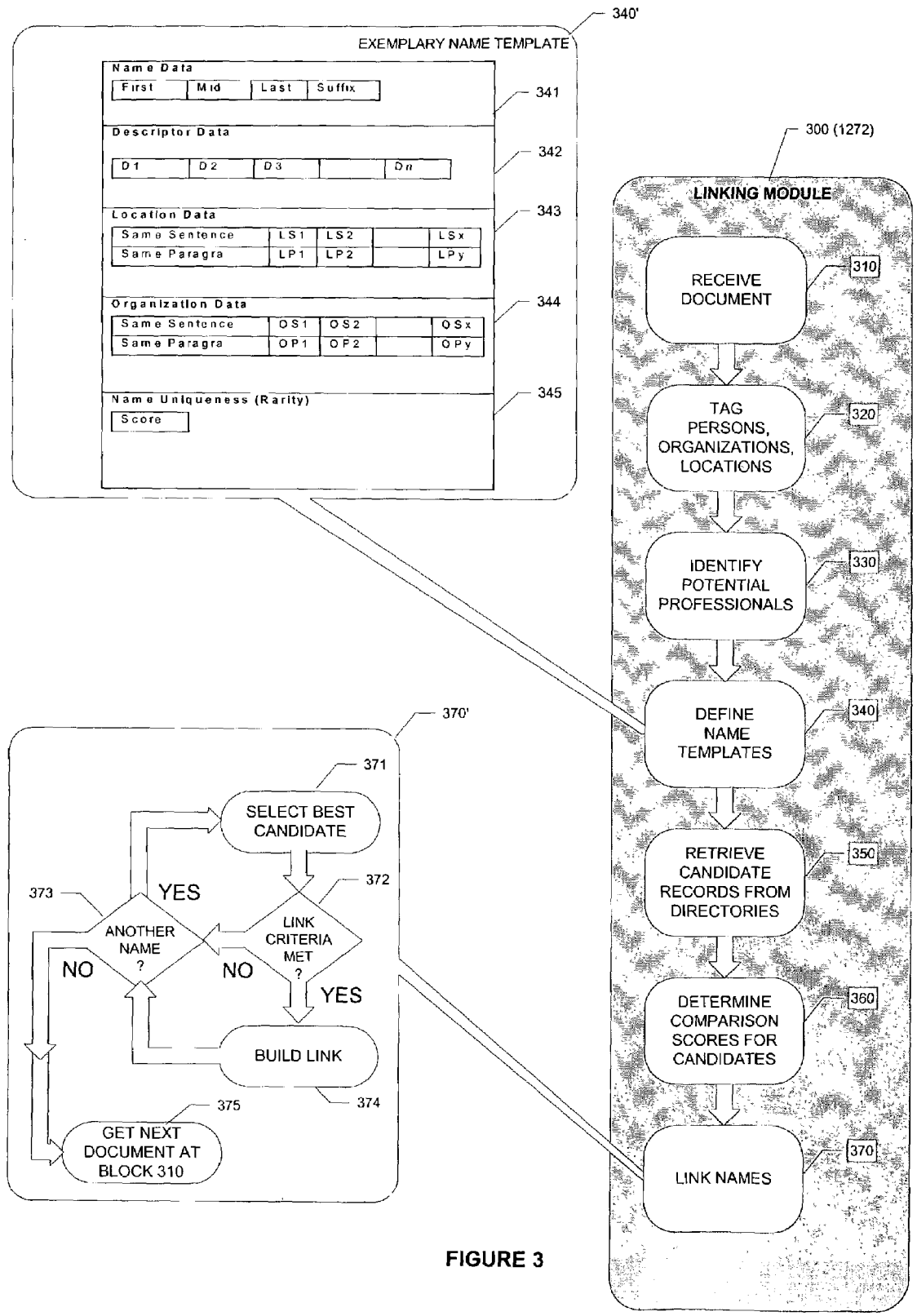
FIG. 3 is a flow chart of an exemplary method of operating system 100 to define a hyperlink between names in a document and names in a database, based on the Bayesian inference network trained according to FIGS. 3-5.

FIG. 3 shows a flowchart 300 of an exemplary method embodied in linking module 1272. Flowchart 300 includes process blocks 310-370.

Execution of the exemplary method ensues at block 310 which entails receiving a document, such as document 112 from input documents database 110. In some embodiments, linking module 1272 executes in the context of one or more sessions initiated by document-processing software 127, and the input document represents an entire document hosted by the document-processing software or one or more selected portions of the document within an active processing window in a document-processing program. However, in other embodiments, the document or document portion is received or retrieved from a currently active processing window in a document-processing program. In some other embodiments, the linking module is a stand-alone application which interacts with one or more databases coupled to a host computer system, such as workstation. Execution continues at block 320.

In block 320, the linking module uses a generic tagger to tag or mark each person, place, and organization name in the input document. The exemplary embodiment uses the same tagger as used in the descriptor module. In the exemplary embodiment, tagging the names also entails resolving apparent co-references to the same name within the input document.

To this end, the exemplary embodiment links references within a document to the same name together, using a set of name comparison rules. These links are termed in-document co-reference chains, or name chains. During the tagging process, the last name of each newly found name is compared against the last names of those names already found. If no matches are found, the newly found name is treated as unique name in the document. If the newly found last name matches an existing last name, the first name paired with the newly found last name is compared to the first name paired with the matching last names. If a first name matches or is compatible, the names are assumed to be the same. If the first name is incompatible with the first name of any of the matching last names, the name is treated as unique in the document. If the newly found name has no clearly associated first name, then the name is treated as a reference to the most recently found name having the same last name. Other embodiments may use other techniques to resolve in-document co-references.

In block 330, the linking module determines which of the one or more tagged name chains is likely to be associated with one or more of the professional directories. In the exemplary embodiment, this entails applying one or more of the profession-descriptive patterns generated by descriptor module 1271. In applying the descriptive patterns, the exemplary embodiment tries to match or map each descriptive pattern for a given profession to the text around each occurrence of a tagged name in the input document. If the descriptive pattern successfully maps to an occurrence of a name, the name (and its in-document co-references) is deemed a candidate professional and added to a list of candidate professionals of a given type. (Other embodiments exploit the regular structure or cue features of documents as further evidence regarding the nature of names in the documents. For examples, judicial opinions (caselaw), include case headers, counsel phrases, concurring opinions, and dates that can be used to identify and/or distinguish attorneys and judges.) The list of candidate name chains is forwarded for further processing at block 340.

Block 340 entails defining one or more name templates or other data structures based on the tagged name chains of candidate professionals and related co-occurring text or other information from the document. In the exemplary embodiment, defining the name templates entails forming for each tagged name chain a collection of sentences in the document that contain a name in the chain, and a collection of paragraphs in the document that contain a name in the chain. In some embodiments, the collections of sentences and paragraphs are document position indicators that denote the start and/or end of sentences and paragraphs.

After forming the sentence and paragraph collections, the linking module defines a template for each name chain, with each template having the form of exemplary name template 340'. Name template 340' includes a name record 341, a descriptor data record 342, an location data record 343, an organization record 344, and a name uniqueness (or rarity) record 345.

Name record 341 includes a first-name field (first), a middle-name field (mid), a last-name field (last), and a suffix field (suffix). Other embodiments include other name-related data such nicknames from a lookup table or common alternative spellings. And still other embodiments exclude one or more of the fields used in the exemplary embodiment, such as suffix.

Descriptor data record 342 includes one or more descriptor fields, such as D1, D2, D3 . . . Dn. Each descriptor field, in the exemplary embodiment, includes sentence fragments extracted from the input document using one or more of the profession-descriptive patterns generated by descriptor module 1271 for a given profession. For a document where a name is repeated or co-referenced at multiple places, the descriptor structures are applied to each occurrence of the name to assemble the set of descriptor fields. Some embodiments may even apply the descriptor patterns to pronoun references to a given name. (In other embodiments, the descriptors also include verbs that co-occur within a certain distance of the names.)

Application of the patterns entails aligning the name portion of each pattern with the names in the sentence collection and determining if the grammar of the adjacent portion (fragment) of the sentence agrees with the grammar of the pattern. If there is agreement, the exemplary linking module copies one or more portions of the corresponding sentence fragment, such as the anchor term, into a respective descriptor field of the descriptor data record 342.

Location data record 343 includes a same-sentence field and a same-paragraph field. The same sentence field includes subfields LS1, LS2, . . . , LSj, with each LS subfield including a location name that co-occurred in a sentence with a reference to the name in name data record 341. The same-paragraph field includes subfields LP1, LP2, . . . , LPk. Each LP subfield includes a location name that co-occurred in a paragraph containing a reference to the name in data record 341. In the exemplary embodiment, constructing this record entails searching for locations in the sentence and paragraph collections for a given name and copying found locations into the respective subfields.

Organization data record 344 includes a same-sentence field and a same-paragraph field. The same sentence field includes subfields OS1, OS2, ..., OSj, with each subfield including an organization that co-occurred in a sentence with a reference to the name in name data record 341. The same-paragraph field includes subfields OP1, OP2, ..., OPk. Each OP subfield includes an organization that co-occurred in a paragraph containing a reference to the name in data record 341.

In the exemplary embodiment, a sentence is understood to include grammatical as well as typographical sentences, and a paragraph includes any group of one or more sentences that are delimited or separated from another group of one or more sentences by punctuation or other signaling device or technique. Also, in the exemplary embodiment, the same-sentence and same-paragraph locations and organizations need not be mutually exclusive. That is, if a term occurs in a sentence with an occurrence of a name, it also occurs within same paragraph containing the sentence. However, in other embodiments, the same-sentence and same-paragraph locations could be defined as mutually exclusive.

Although the exemplary embodiment provide implicit positional information for the locations and organizations through the structure of the same-field and same-paragraph fields, other embodiments may use other techniques to incorporate position information relative to a given name in the name template. For example, some embodiments use character, word, sentence, paragraph, or page offset from the name, or more precisely a given name occurrence. Other embodiments provides positional information as a set of binary codes or flags, with each flag indicating whether a logically associated or corresponding location or organization occurred within a sentence or paragraph with its associated name. Still other embodiments provide flags that indicate whether the places are within or without a certain text window or document region relative to a name. Yet, other embodiments provide relative document position or absolute document position for each organization or place.

Name uniqueness (or rarity) record 345 includes a score field which contains an indicator of uniqueness or rarity of its associated name. In the exemplary embodiment, this indicator is a numerical quantity indicative of a prior probability of a name matching a candidate record drawn from a particular directory. More specifically, the exemplary embodiment defines the quantity as the probability of name uniqueness and computes it using $$P(nameUniqueness) = \frac{1}{(H' \cdot P(name)) + 1} \quad (9)$$

where H' denotes the size of the professional class indicated by the descriptor match and P(name) is defined as $$P(name) = P(\text{first name}) \cdot P(\text{last name}) \quad (10)$$

where P( first name) denotes the probability of drawing the first name at random from all the first names in a name list representative of the general population and P(last name) similarly denotes the probability of drawing the last name at random from all the last names in a name list representative of the general population.

Although the exemplary embodiment uses a template, such as name template 340' for multiple types of professions, some embodiments may omit or add other template features. For example, templates for judges may omit separate location information, since organization information, such as a court name, implicitly contains location information. Other embodiments may omit information altogether rather than just its explicit form.

Block 350, which is executed after defining the name templates in block 340, retrieves a set of candidate directory entries from one or more of professional directories 130. To this end, the exemplary embodiment searches for directory entries that have the same last name as one of the candidate professional names. It then retrieves full name, title, organization, location, and entry identification information for these candidate directory entries for further processing in block 360.

Block 360 entails comparing and scoring the similarity of each name template to one or more of the retrieved candidate records or data structures. In the exemplary embodiment, this entails use of one or more Bayesian inference systems, such as the one shown in FIG. 4.

Figure 4:
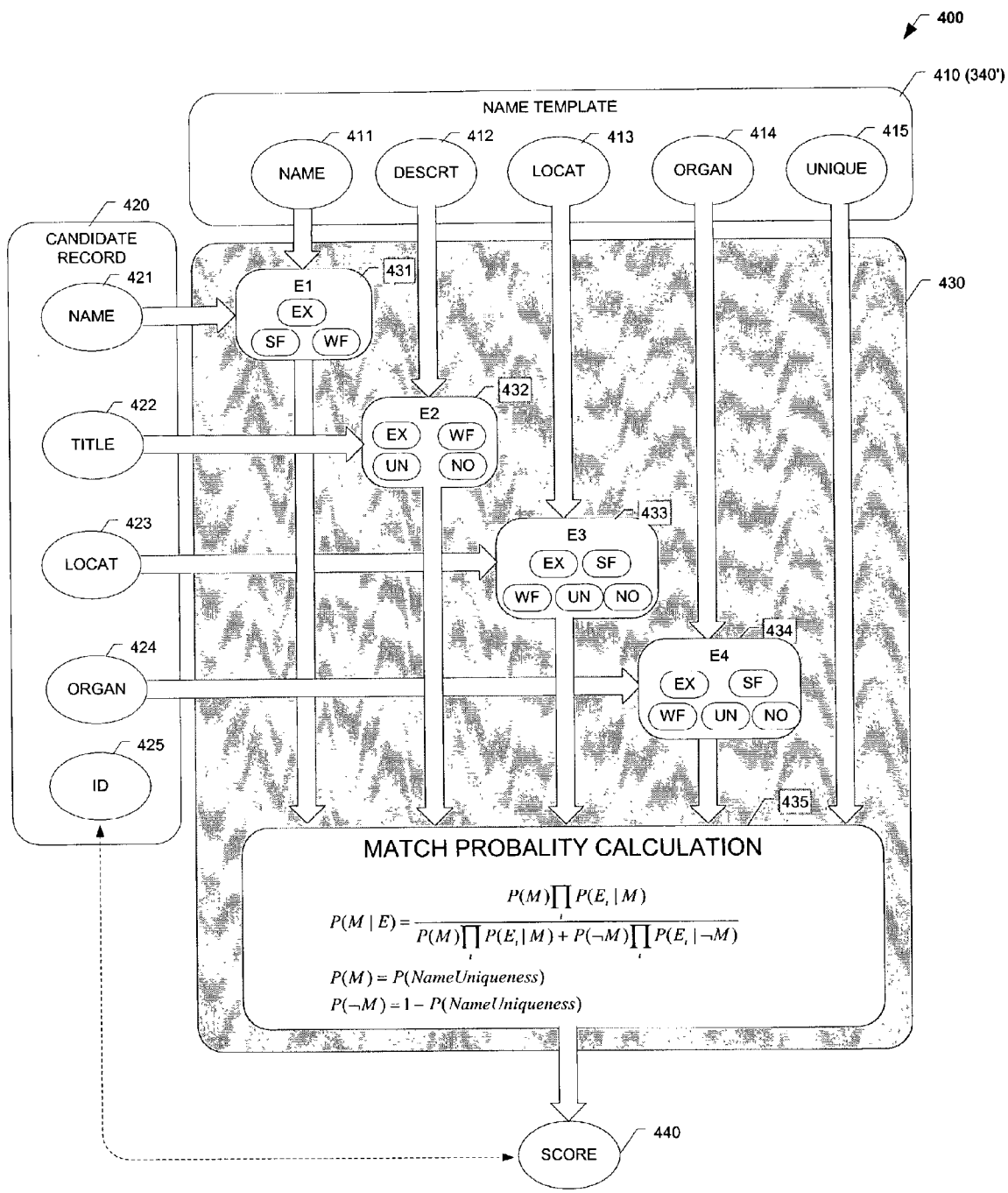
FIG. 4 is a block diagram of an exemplary Bayesian inference system used in operating system 100 to define hyperlinks.

FIG. 4 show an exemplary inference system 400 which includes input name template 410, and an input candidate record 420, and one or more Bayesian inference engines, such as Bayesian inference engine 430.

Input name template 410 includes name data 411, descriptor data 412, location data 413, organization data 414, and name uniqueness data 415. Input candidate record 420 includes name data 421, title data 422, location data 423, organization data 424, and record identification data 425.

Inference engine 430 includes evidence comparison modules 431-434 and calculation module 435. Comparison modules 431-434 include respective data and logical rule structures which define various comparison states and associated probabilities. In the exemplary embodiment, each inference engine is tailored to a specific professional directory or other database. Also, the exemplary embodiment implements each engine using a re-configurable software module with configuration options for defining the comparison logic and calculations. However, other embodiments may use entirely distinct inference-engine structures.

Each comparison module generally includes two or more mutually exclusive states indicating a potential result of comparing a candidate data item to a respective input data item. Each state is associated with specific comparison logic and conditional probabilities for the state given that a candidate record matches the input name template and given that the candidate records do not match the input name template. (Some embodiments include multiple sets of states, logic, and conditional probabilities, with each set associated with a particular professional directory or profession.) Exemplary states include: an exact match, a strong-fuzzy match, a weak-fuzzy match, an unknown (or unspecified) match, and a mismatch.

An exact match occurs when the data items or elements match exactly. A strong-fuzzy match occurs when the elements fall short of matching exactly, but are strongly compatible. A weak fuzzy match occurs when the elements fall short of matching exactly, but are weakly compatible. An unknown match occurs when there is insufficient information to determine whether the data match or mismatch. And, a mismatch occurs when the items have no compatibility.

More precisely, the exemplary embodiment defines each of the states for each evidence comparison module as follows: Comparison module 431 has three states: an exact-match (EX) state; a strong-fuzzy (SF) state; and a weak-fuzzy (WF) state. For an exact match to occur all the components of an extracted name must exactly those of a candidate record. For example, Abraham Lincoln exactly matches Abraham Lincoln, but not Abe Lincoln, Abraham Lincoln, Jr., or Abraham S. Lincoln. For a strong-fuzzy match, the first and last name in the tagged document must match the first and last name in the record, with all other components in the record being unspecified or blank. Thus, Abraham Lincoln is a strong fuzzy match with Abraham Lincoln, Jr. and Abraham S. Lincoln. For a weak fuzzy match, only the last name matches while all other components are unspecified or have matching variant forms such as nicknames. Thus, Abraham Lincoln is a weak fuzzy match to Abe Lincoln. (Although not shown in the Figures, comparison 431 exemplarily includes or has access to a database of names and common nicknames or variants, which it accesses when name comparison reveals that first names do not match exactly. Other embodiments, however, may include such nicknames into the name template itself or even omit nickname consideration completely.)

Comparison module 432 includes four states: an exact-match (EX) state, a strong-fuzzy (SF) state, a weak-fuzzy (WF) state, and a no match (NO) state. An exact match occurs where all elements of a fully specified descriptor match. For example, the descriptor "U.S. Supreme Court Justice" exactly matches the title "U.S. Supreme Court Justice." A strong fuzzy match occurs where some but not all of the elements of a descriptor and title match. For example, the descriptor "Supreme Court Justice is a strong fuzzy match to the title U.S. Supreme Court Justice. An unknown state occurs when the descriptor identifies a general profession that is consistent with the profession(s) covered by the directory. For example, if the descriptor is "judge" and the title in the directory entry is "U.S. 8th Circuit Court judge," then the match is deemed unknown or unspecified. A mismatch or "no match" state occurs when the descriptor conflicts with or inconsistent with the specification in the record. For example, if the descriptor is New York District judge and the title in the directory entry is "U.S. 8th Circuit Court judge," then the match state is mismatch.

Comparison module 433, which compares location evidence, has five match states: an exact-match (EX) state, a strong-fuzzy (SF) state, a weak-fuzzy (WF) state, an unknown or unspecified (UN) state, and a no match (NO) state. An exact match occurs where city and state location evidence that is explicitly linked within the document to the extracted name matches the city and state of a directory record. An explicit linkage occurs, for example, when the location co-occurs in the same sentence. A strong-fuzzy match occurs when the city or state that occurs in the same paragraph with the extracted name matches the corresponding city or state in a candidate directory. A weak-fuzzy match occurs when the city or state that occurs in the same document but outside the same paragraph of the extracted name matches the city or state listed in a directory entry. The unknown, or unspecified, state occurs when the extracted name is not explicitly linked to a particular city or state and none of the locations in the text match the city or state information in the candidate record. A mismatch occurs when the extracted name is explicitly linked to a city or state name that does not match the city or state information in the candidate record.

Comparison module 434, which compares organization data, has five states: an exact-match (EX) state, a strong-fuzzy (SF) state, a weak-fuzzy (WF) state, an unknown or unspecified (UN) state, and a no match (NO) state. An exact match occurs when an extracted name is explicitly linked to a particular organization in the text and that organization matches the organization in the candidate record. An explicit linkage occurs, for example, when the location co-occurs in the same sentence. For example, an exact match exists if text describes an attorney as working at the firm of Smith & Jones and the directory entry lists Smith & Jones as an associated law firm or other organization. A strong-fuzzy match occurs if the extracted name occurs in the same paragraph as the extracted organization and if the extracted organization matches the organization in a candidate record. A weak-fuzzy match occurs if the extracted name occurs in the same document but outside the paragraph and if the extracted organization matches the candidate organization. An unknown match occurs when the extracted name is not explicitly linked to a particular organization and none of the organization names in the text matches the organization information in the candidate record. And, a mismatch occurs when the extracted name is explicitly linked to an organization name and that organization name does not match the organization name in the candidate record.

The table below summarizes the various states that are in effect for each of the evidence comparison modules in the exemplary Bayesian inference engine.

| Evidence | States | | | | |
|---|---|---|---|---|---|
| | Exact Match | Strong Fuzzy Match | Weak Fuzzy Match | Unknown | No Match |
| E1 Name | ✓ | ✓ | ✓ | — | — |
| E2 Descriptor | ✓ | ✓ | — | ✓ | ✓ |
| E3 Organization | ✓ | ✓ | ✓ | ✓ | ✓ |
| E4 Location | ✓ | ✓ | ✓ | ✓ | ✓ |

Evidence comparison modules 431-434 conduct their respective comparisons and output their results in the form of eight conditional probabilities to calculation module 435.

Calculation module 435 calculates a similarity score or match probability based on these conditional probabilities and the uniqueness or name-rarity data for the input name template. The exemplary calculation uses the following form of Baye's rule:

$$P(M/E) = \frac{P(M)\prod_{i=1}^{4} P(E_i/M)}{P(M)\prod_{i=1}^{4} P(E_i/M) + P(\neg M)\prod_{i=1}^{4} P(E_i/\neg M)} \quad (11)$$

where $P(M|E)$ denotes the probability that a template matches a candidate record given a certain set of evidence, such as an input name template and a candidate record. $P(M)$ denotes the prior probability that a template and biography record match (that is, refer to the same person), and $P(\neg M)$ denotes the prior probability that a template and biographical record do not match. The exemplary embodiment defines $P(M)$ as the probability of name uniqueness or name-rarity within the professional population, and $P(\neg M)$ as $$P(\neg M) = 1 - P(M) \quad (12)$$

$P(E_i|M)$ is the conditional probability that $E_i$ takes on a particular state given that the input name template matches the candidate record. For example, if $E_3$ denotes location match evidence, then $P(E_3|M)$ denotes the probability that the location information in the name template and candidate record have the match state determined by comparison module 433 (exact match, strong fuzzy mach, weak fuzzy match, unknown match, or no match) given that a name template and candidate record match. $P(E_i|\neg M)$ denotes the conditional probability that $E_i$ takes on a particular state given that a name template does not match any record in the professional directory. For example, $P(E_3|\neg M)$ denotes the probability that the location information in a person template and candidate record match given that the template and candidate do not match. (Other embodiments include lesser or greater numbers of states, as well as other types of co-occurring information.)

The score for each candidate record-name-template comparison is associated with a candidate record identification 424 for the candidate record. In FIG. 4, this association represented by the broken line between score 440 and candidate record identification 425. In FIG. 3, execution continues at block 370.

In block 370, the linking module links one or more of the professional names tagged in the input document to one or more of the candidate professional directories based on the comparison scores. In the exemplary embodiment, this entails executing process blocks 371-375 shown in inset 370'.

Block 371 selects the best candidate record from among the candidate records for a particular name template. Specifically, this entails selecting the candidate having the highest comparison score. If there is no single candidate having the highest score, the exemplary embodiment advances to block 372 without selection of a candidate for the name template. However, other embodiments could employ some form of tie breaker (for example one based on chronology), or construct links to each of the highest ranking candidate records with a message qualifying uncertainty in the link accuracy, or build a link that presents a menu of the highest ranking candidates for the user.

Block 372 determines if the selected candidate record meets other criteria. To this end, the exemplary embodiment determines if the score of the selected candidate record satisfies a given threshold criterion, such as greater than or equal to 0.05. However, other embodiments use additional criteria, such as commercial or chronological relationship with the professional directory containing the candidate record. If the candidate record satisfies the link criteria execution, continue at block 373.

Block 373 entails building a hyperlink that links at least one occurrence of the name under consideration in the input document to the entry in the professional directory hosting the candidate record. In the exemplary embodiment, this includes marking all occurrences of the name in the document and embedding a URL (uniform resource locator) identifying the candidate record in the document. (In some embodiments, the candidate reference identification and a document identification number for the input document are written into an index that can be used to facilitate name-based searching and further document linking between the professional directories and document databases.) The marking can take any number of forms, such as a font change relative to other text in the document. Other embodiments may insert a hyperlink that references the professional directory, instead of a particular record in the directory. Other templates include character-offset information for use in placing hyperlinks at the correct spot within a given sentence, paragraph, or document. Still other embodiments may define the hyperlink in terms of one or more intermediate destinations that are forwarded or otherwise routed to the directory or directory record to effect the desired linkage.

After building the link in block 373 (or after determining that the link criteria is not met at block 372), execution proceeds to block 374. Block 374 determines whether the input document contains another name for possible linkage. An affirmative determination returns execution to block 371 for selection of a candidate record for another name template, and a negative determination branches execution to block 375. Block 375 returns execution to block 310 to receive another input document for further processing.

C. Training Module Structure and Operation

Figure 5:
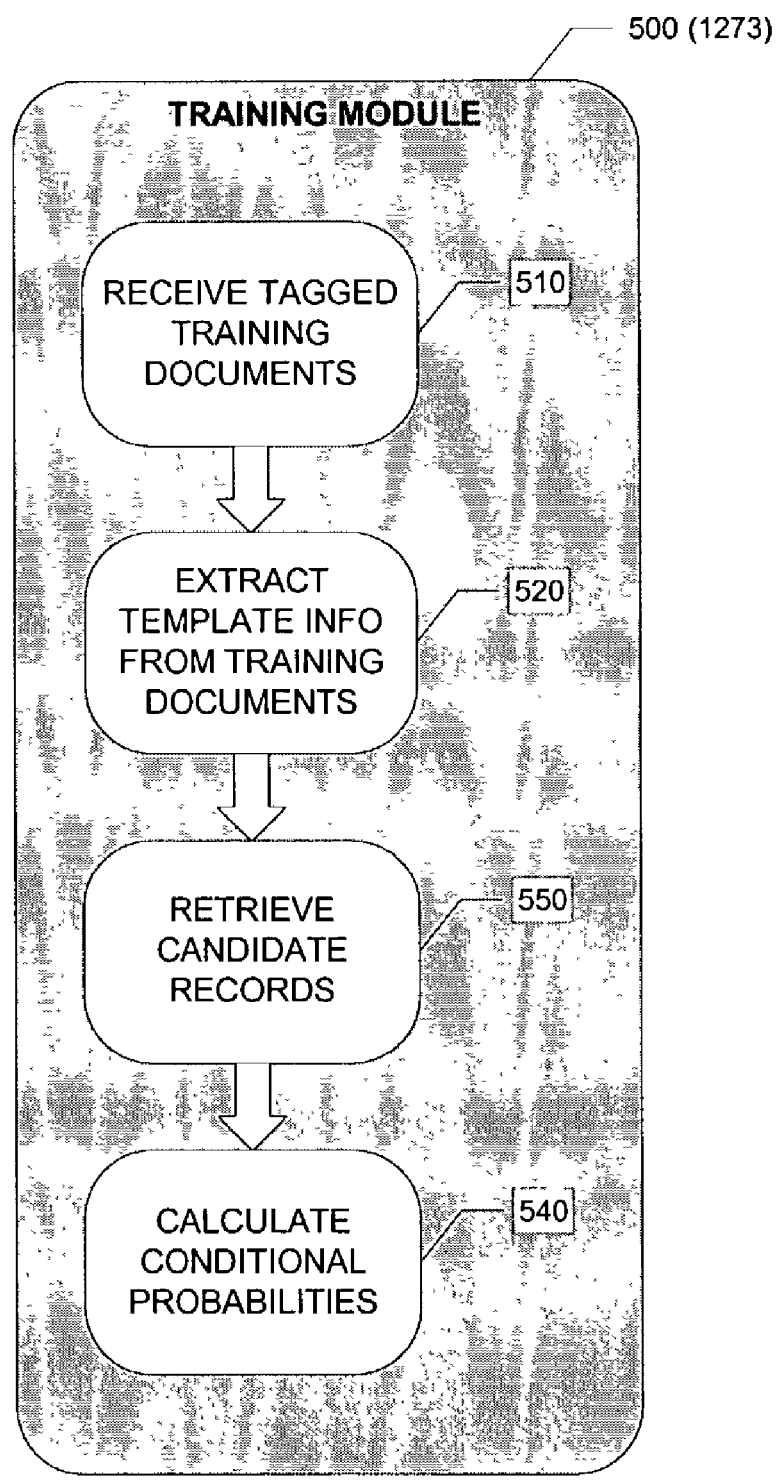
FIG. 5 is a flow chart of an exemplary method of operating system 100 to train a Bayesian inference network for use in measuring likelihood that a name in a document and a name in a database refer to the same person.

FIG. 5 shows a flowchart 500, which illustrates exemplary structure and operation of training module 1273 to define the conditional probabilities used in the Bayesian inference engine of FIG. 4. Flowchart 500 includes process blocks 510-560.

At block 510, execution begins by receiving a set of training documents having tagged names that are known to match names in a professional directory. In the exemplary embodiment, the training documents are manually tagged; however, in other embodiments the documents may be automatically tagged. The training documents may be held in a local or remote database and communicated to the training module via a variety of transfer techniques.

Block 520 entails extracting data from the training documents based on the tagged names. To this end, the exemplary embodiment generates a name template, using the extraction module from linking module 1272, for each tagged name, with each template including an extracted name, extracted descriptor text, extracted location list, an extracted organization list. The name template has a structure similar to that of name template 340' in FIG. 3.

Block 530 entails searching one or more professional directories, based on the names in the training data structures. In the exemplary embodiment, this entails searching one or more of the professional directories and retrieving directory entries with last names that match the last names in the name templates for further processing.

Block 540 entails determining conditional probabilities for each state of each evidence variable. In the exemplary embodiment, this determination entails determining frequency counts for each comparison state based on the name templates for the manually tagged set of documents. Specifically, for cases in which a tagged name has been manually matched to a candidate record, the embodiment counts the number of times each particular evidence state occurs for each of the evidence variables: name, descriptor, location, and organization. The embodiment then divides the count for each evidence state by the total number of matches to obtain $P(E_i|M)$ that is, the conditional probability values for each state given a match. More precisely, the exemplary embodiment determines the conditional probabilities using a formula, such as $$P(E_i = \text{particular state} / M) = a\frac{y}{z} + \frac{1-a}{x} \tag{13}$$

where x denotes the number of evidence states for evidence variable $E_i$; such as three states for name; y denotes the number of directory records for which the particular state, for example, exact match occurred; z denotes total number of attorney match pairs; a is a smoothing constant, such as 0.999999.

Similarly, the exemplary embodiment counts the number of times each evidence state occurs when the candidate name does not match the template name and divides by the total mismatches to get $P(E_i \neg M)$ for each state, that is the probability of a particular evidence state match given a mismatch in the names. To reduce computations, some embodiments may sample the matching and/or mismatching candidate records, for example, by selecting every tenth record.

Other Applications

Figure 6:
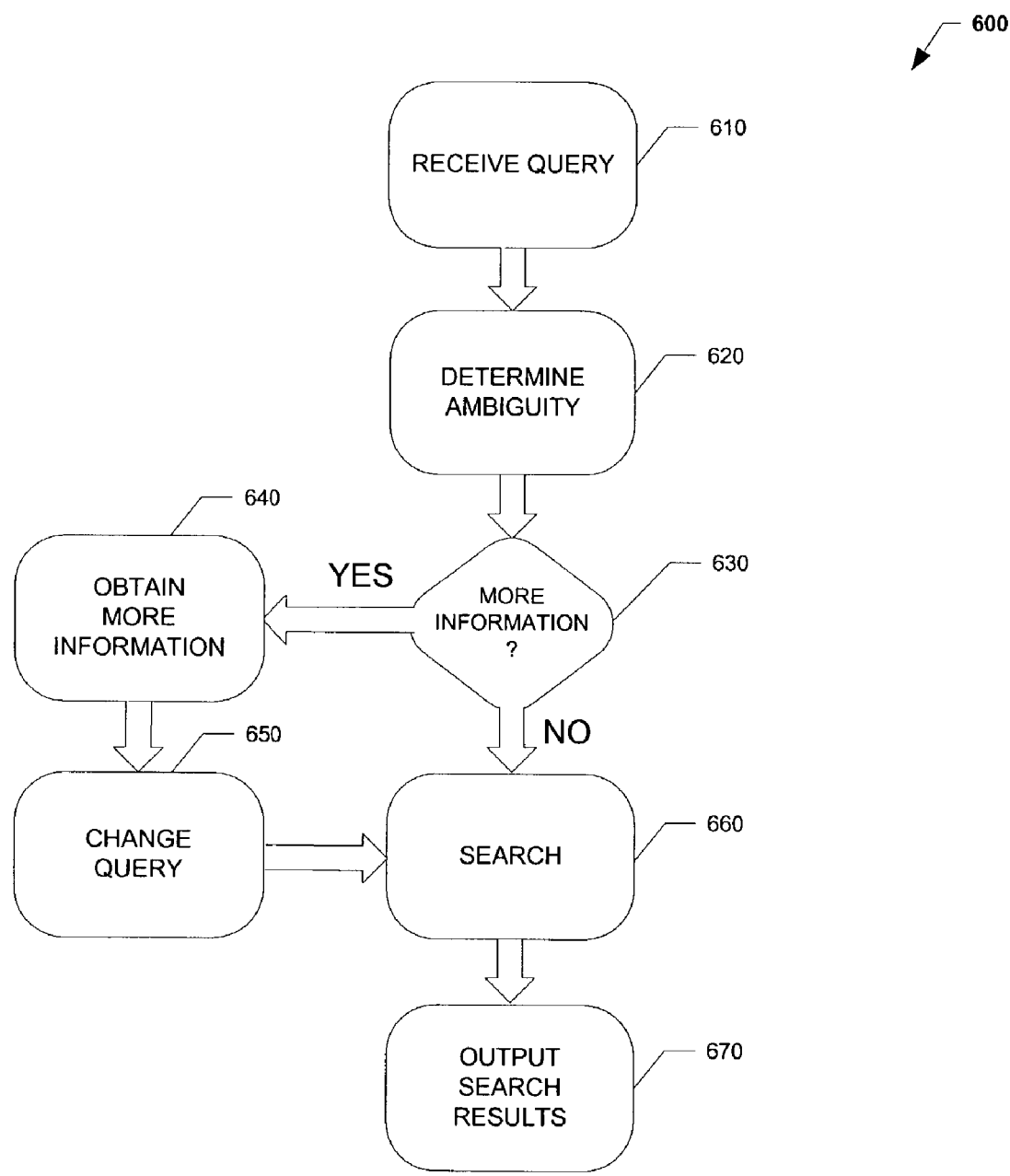
FIG. 6 is a flow chart of an exemplary search method that incorporates teachings of the present invention.

FIG. 6 shows that the teachings of the present have applications beyond facilitating generation of hyperlinks for names. In particular, FIG. 6 shows a flowchart 600 of an exemplary method of operating a data retrieval system incorporating teachings of the present invention. Flowchart 600 includes process blocks 610-670.

In block 610, the exemplary method begins with receipt of a query for information. In the exemplary embodiment, the query has a Boolean or natural-language form and includes a name of an entity, such as a person. In some embodiments, the query is provided by a user of a client computer or access device, such as one of access devices 150 in FIG. 1, to a server, such as database server 140 in FIG. 1, in a client-server environment. In these cases, the exemplary method is incorporated into software on a server. However, in other embodiments, the query may be received and processed (in accord with this exemplary method) on the client side before transmission to a server for execution. In such cases, the exemplary method may be incorporated into a browser, a browser add-on, a client-side operating system or searching software.

Block 620 entails determining the ambiguity of the query or one or more terms in the query. In the exemplary embodiment, this entails identifying at least one name in the query and computing a probability of name uniqueness according to $$P(nameUniqueness) = \frac{1}{(H \cdot P(\text{name})) + 1} \quad (14)$$

where H denotes the estimated size of the human population likely to be referenced in the corpus or database targeted by the query. One way to estimate H is to take the size of the community corpus likely to be referenced and scale it up by some percentage to account for inevitable references to people outside the referenced community. P(name) is defined as $$P(\text{name}) = P(\text{first name}) \cdot P(\text{last name}) \quad (15)$$

where P(first name) denotes the probability of drawing the first name at random from all the first names in a relevant search universe, such as a professional directory and P(last name) similarly denotes the probability of drawing the last name at random from all the last names in the universe.

Block 630 determines whether to request additional information to assist in answering the query based on the determined ambiguity of a name (or other portion) in the query. In the exemplary embodiment, this entails comparing the computed probability of name uniqueness to a threshold. If the probability of name uniqueness is less than the threshold, execution advances to block 640; otherwise execution continues at block 660.

Block 640 entails obtaining additional information regarding the query. In one exemplary embodiment, obtaining the additional information entails requesting the user for additional information related to one or more ambiguous portions of the query, such as a name in the query. The request, in some embodiments, is presented as a dialog window requesting information related to a profession, a location, and/or an organization associated with the name.

In another embodiment, obtaining additional information entails automatically formulating one or more queries based on one or more ambiguous portions of the received query, such as the identified name or a portion of the name, and executing the query against one or more databases, for example, professional directories or other databases that include names in association with other data. For example, one query can request records or portions of records having last names that match the last name of a name identified in the received query. The portions of the records, in one embodiment, includes location, organization, and/or professional title information. After obtaining the additional information, execution advances to block 650.

Block 650 entails changing the query based on the additional information. In one embodiment that requests additional information from the user, changing the query includes adding one or more portions of the additional information to the query, for example as one or more appended text strings. However, some other embodiments change the query by adding a search operator, for example, an AND operator, and one or more portions of the additional information. In still other embodiments, particularly some that obtain additional information through use of automatic sub-queries, changing the query includes adding one or more sub-queries, using additional information, such as city, state, organization, and professional title obtained at block 650. In some other embodiments, changing the query includes changing the scope of the search by for example, adding or deleting one or more target databases for the query, based on the additional information.

Block 660 conducts a search based on the original query or the changed query. In one exemplary embodiment, searching based on the changed query entails executing the search against an original target database and/or one or more other databases. Execution continues at block 670.

Block 670 entails outputting the results of the queries. In the exemplary embodiment, this entails outputting the results on a display. In one embodiment that changes the received query by adding sub-queries based on the additional information, outputting the results includes displaying results of the original received query and results of the sub-queries in separate regions of a display screen. In some variants of this embodiment, the results in both regions are ranked.

Still other applications of the teachings of the present invention include generating new name directories for databases based on famous names, political figures, celebrities, filling gaps in current directories, identifying or discovering gaps in directories. Other applications include automatic generation of dossiers, and cross-referencing of individuals, businesses, assets, and public and private records.

CONCLUSION

In furtherance of the art, the inventor has presented various exemplary systems, methods, and software which facilitate logical association of names in documents or other data structures to data structures, such as records, in professional directories or other type databases. Additionally, the inventor has presented various systems, methods, and software for processing and augmenting queries based on ambiguous query terms, such as entity names.

The embodiments described above are intended only to illustrate and teach one or more ways of practicing or implementing the present invention, not to restrict its breadth or scope. The actual scope of the invention, which embraces all ways of practicing or implementing the teachings of the invention, is defined only by the following claims and their equivalents.

The invention claimed is:

1. A computer-implemented method comprising:
    identifying one or more person names in a set of one or more documents, with each identified person name more likely to refer to a single person in a profession than other person names in the document;
    identifying descriptive language from one or more documents, based on the identified names; and
    identifying within one or more documents other person names that refer to persons in the profession, based on one or more portions of the identified descriptive language.

2. The method of claim 1, wherein identifying person names in a set of documents comprises:
    identifying a plurality of person names in the set of documents, with each name including at least a last name;
    calculating for each of the plurality of person names, a quantity based on a probability of drawing its last name at random from a set of last names in a search universe.

3. The method of claim 1, wherein calculating for each of the plurality of person names a quantity based on the probability of drawing its last name at random from a set of last names, includes:
    calculating a quantity based on a size of a human population, a probability of drawing a first portion of the name at random from all the first names in a relevant search universe, and a probability of drawing a second portion of the name at random from all the last names in the search universe.

4. The method of claim 1, wherein identifying descriptive language from one or more documents, based on the identified names comprises identifying appositives related to the identified names.

5. The method of claim 1, wherein identifying descriptive language from one or more documents, based on the identified names in the set of documents comprises:
    identifying a set of terms, including one or more first terms preceding one or more of the identified names and one or more second terms succeeding one or more of the identified names.

6. The method of claim 1, wherein the one or more first terms includes one or more parts of speech and one or more of the second terms includes one or more parts of speech.

7. A machine-readable medium comprising machine executable instructions for:
    identifying one or more person names in a set of one or more documents, with each identified person name more likely to refer to a single person in a profession than other person names in the document;
    identifying descriptive language from one or more documents, based on the identified names; and
    identifying within one or more documents other person names that refer to persons in the profession, based on one or more portions of the identified descriptive language.

8. A system comprising:
    at least one processor
    a memory coupled to the processor, the memory including instructions for:
        identifying one or more person names in a set of one or more documents, with each identified person name more likely to refer to a single person in a profession than other person names in the document;
        identifying descriptive language from one or more documents, based on the identified names; and
        identifying within one or more documents other person names that refer to persons in the profession regardless of their name uniqueness, based on one or more portions of the identified descriptive language.

* * * * *

UNITED STATES PATENT AND TRADEMARK OFFICE
CERTIFICATE OF CORRECTION

PATENT NO. : 7,333,966 B2
APPLICATION NO. : 10/171170
DATED : February 19, 2008
INVENTOR(S) : Dozier It is certified that error appears in the above-identified patent and that said Letters Patent is hereby corrected as shown below:

On the face page, in field (74), in "Attorney, Agent, or Firm", in column 2, line 1, delete "Scwegman," and insert -- Schwegman, --, therefor.

On page 3, under "Other Publications", in column 1, line 21, delete ""Disamiguating" and insert -- "Disambiguating --, therefor.

On page 3, under "Other Publications", in column 1, line 25, delete "Liraries." and insert -- Libraries. --, therefor.

On page 3, under "Other Publications", in column 1, line 29, delete "Envvionemt" and insert -- Environment --, therefor, On page 3, under "Other Publications", in column 1, line 54, delete "Disclsoure," and insert -- Disclosure, --, therefor.

On sheet 3 of 6, in Fig. 3 (Box 344), line 1, delete "Organizatlon" and insert -- Organization --, therefor.

On sheet 4 of 6, in Fig. 4 (Box 435), line 1, delete "PROBALITY" and insert -- PROBABILITY --, therefor.

On sheet 5 of 6, in Fig. 5, line 1, above "540" delete "550" and insert -- 530 --, therefor.

In column 2, line 67, delete "FIGS. 3-5." and insert -- FIG. 5. --, therefor.

In column 8, line 27, after "respective" delete "the".

In column 8, line 47, delete "indirectory" and insert -- in-directory --, therefor.

In column 9, line 16, before "In" insert -- . --.

In column 9, line 31, delete "as,"" and insert -- as, " --, therefor.

In column 12, line 25, after "342," delete "an" and insert -- a --, therefor.

In column 13, line 58, delete "P( first" and insert -- P(first --, therefor.

In column 16, line 40, delete "Baye's" and insert -- Bayes --, therefor.

In column 17, line 67, delete "372 )," and insert -- 372), --, therefor.

UNITED STATES PATENT AND TRADEMARK OFFICE
CERTIFICATE OF CORRECTION

PATENT NO. : 7,333,966 B2
APPLICATION NO. : 10/171170
DATED : February 19, 2008
INVENTOR(S) : Dozier It is certified that error appears in the above-identified patent and that said Letters Patent is hereby corrected as shown below:

In column 19, line 1, delete "$P(E_i \neg M)$" and insert -- $P(E_i | \neg M)$ --, therefor.

In column 22, line 26, in Claim 8, after "processor" insert -- ; --.

Signed and Sealed this

Twelfth Day of August, 2008

JON W. DUDAS
*Director of the United States Patent and Trademark Office*